(12) United States Patent
Naito et al.

(10) Patent No.: US 11,192,905 B2
(45) Date of Patent: Dec. 7, 2021

(54) METHOD FOR PRODUCING CYCLIC POLYSILANE COMPOUND

(71) Applicant: Kureha Corporation, Tokyo (JP)

(72) Inventors: Ryota Naito, Tokyo (JP); Hiraku Tohmiya, Tokyo (JP); Eri Tamaki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 17/270,749

(22) PCT Filed: Aug. 30, 2019

(86) PCT No.: PCT/JP2019/034071
§ 371 (c)(1),
(2) Date: Feb. 23, 2021

(87) PCT Pub. No.: WO2020/045614
PCT Pub. Date: Mar. 5, 2020

(65) Prior Publication Data
US 2021/0277036 A1    Sep. 9, 2021

(30) Foreign Application Priority Data

Aug. 30, 2018  (JP) .............................. JP2018-161800

(51) Int. Cl.
*C07F 7/21*  (2006.01)

(52) U.S. Cl.
CPC ...................... *C07F 7/21* (2013.01)

(58) Field of Classification Search
CPC ....................................................... C07F 7/21
See application file for complete search history.

(56) References Cited

U.S. PATENT DOCUMENTS

| 2018/0179338 A1* | 6/2018 | Noda | ...................... C08G 77/08 |
| 2020/0407379 A1* | 12/2020 | Naito | ...................... C08G 77/60 |

FOREIGN PATENT DOCUMENTS

| JP | 54-130541 A | 10/1979 |
| JP | 54130541 A * | 10/1979 |
| JP | H10-182834 A | 7/1998 |
| JP | 2001-281871 A | 10/2001 |
| JP | 2001281871 A * | 10/2001 |
| JP | 2003-313190 A | 11/2003 |
| JP | 2003313190 A * | 11/2003 |
| JP | 2017-57310 A | 3/2017 |

OTHER PUBLICATIONS

T. Takayama et al., 220 Journal of Molecular Structure, 243-250 (1990) (Year: 1990).*
A. Bilyachenko et al., European Journal of Inorganic Chemistry, 5240-5246 (2013) (Year: 2013).*
S. Kashimura et al., 49 Tetrahedron Letters, 269-271 (2008) (Year: 2008).*
H. Lange et al., 25 Main Group Metal Chemistry, 155-162 (2002) (Year: 2002).*
H. Sakurai et al., 94 The Journal of Physical Chemistry, 1837-1843 (1990) (Year: 1990).*
Extended European Search Report dated Jun. 7, 2021, in European Patent Application No. 19853673.2.
English translation of International Preliminary Report on Patentability and Written Opinion dated Mar. 11, 2021, in PCT/JP2019/034071.
Office Action dated Sep. 21, 2021, in Japanese Patent Application No. 2020-539615.

* cited by examiner

*Primary Examiner* — Alexander R Pagano
(74) *Attorney, Agent, or Firm* — Birch, Stewart, Kolasch & Birch, LLP

(57) ABSTRACT

Provided is a method for producing a cyclic polysilane compound simply and easily in a higher yield. The method for producing a cyclic polysilane compound according to an embodiment of the present invention comprising a reaction step of adding a silane monomer compound represented by Formula (I) below into a liquid mixture containing metallic sodium and a lithium salt and allowing them to react:

[Chem. 1]

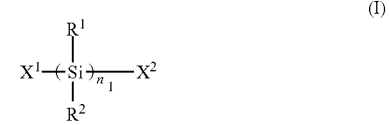

(I)

where, $R^1$ and $R^2$ each independently represent a hydrogen atom, a hydrocarbon group, an alkoxy group, or a halogen atom, $X^1$ and $X^2$ each independently represent a halogen atom or an alkoxy group, and $n_1$ is an integer that is greater than or equal to 1.

6 Claims, No Drawings

METHOD FOR PRODUCING CYCLIC POLYSILANE COMPOUND

TECHNICAL FIELD

The present invention relates to a method for producing a cyclic polysilane compound.

BACKGROUND ART

Silicon carbide fibers are fibers having excellent heat resistance and oxidation resistance even in high temperature atmosphere at a thousand and several hundreds degrees. This property is expected to be applied in the nuclear and aerospace fields.

The silicon carbide fibers can be obtained by subjecting an organosilicon polymer compound such as polycarbosilane, which is a precursor, to spinning, infusibilization, and firing. To obtain silicon carbide fibers having extreme heat resistance, introduction of oxygen atoms into the polymer compound constituting the fibers needs to be inhibited. Therefore, silicon carbide fibers having extreme heat resistance are produced by using an organosilicon polymer compound having a low oxygen content and, for infusibilization, by employing a method that does not introduce oxygen. Cyclic polysilane compounds, such as dodecamethylcyclohexasilane, can provide polycarbosilane with approximately 0.1 wt % of oxygen content, and thus is useful as a raw material for organosilicon polymer compound, which serves as a precursor of silicon carbide fibers.

Various studies have been made to obtain polysilane compounds. For example, Patent Document 1 describes a method including synthesizing a polysilane compound by adding a reaction solution containing dispersion obtained by dispersing alkali metal in an inactive solvent.

Furthermore, Patent Document 2 describes a method of adding dihalosilane in an aprotic solvent containing a metal halide and an alkali metal to obtain a noncyclic polysilane compound.

Patent Document 3 describes, as a method of manufacturing dodecamethylcyclohexasilane, a method in which polydimethysilane is obtained by heating xylene and metallic sodium under reflux and dropwisely adding dichlorodimethylsilane, and then, the purified polydimethylsilane, a dispersion of metallic sodium in naphthalene, and tetrahydrofuran (THF) are mixed under stirring at room temperature, then heated and refluxed under stirring, and then cooled to room temperature, after which ethanol is added thereto.

Patent Document 4 describes a method of producing a mixture of a cyclic polysilane compound and a chain polysilane compound by reacting magnesium or a magnesium alloy with an organic dihalosilane in the co-presence of a lithium salt and a metal halide.

CITATION LIST

Patent Document

Patent Document 1: JP 2017-57310 A
Patent Document 2: JP 10-182834 A
Patent Document 3: JP 54-130541 A
Patent Document 4: JP 2001-281871 A

SUMMARY OF INVENTION

Technical Problem

However, with technologies like Patent Documents 1, 2, and 4, it is difficult to obtain a cyclic polysilane compound in a high yield.

The technology described in Patent Document 3 includes purification operation to remove the solvent (xylene) from the synthesized polydimethylsilane and has a problem that the operation is complicated.

The present invention is made in light of the problems described above. An object of the present invention is to provide a method for producing a cyclic polysilane compound simply and easily in a higher yield.

Solution to Problem

As a result of diligent research to solve the problems described above, the present inventors found that a cyclic polysilane compound can be produced in a higher yield by dropwisely adding a silane monomer compound in a solution containing metallic sodium and a lithium salt, and thus completed the present invention.

That is, the present invention relates to a method for producing a cyclic polysilane compound including a reaction step of adding a silane monomer compound represented by Formula (I) below into a liquid mixture containing metallic sodium and a lithium salt and allowing them to react.

[Chem. 1]

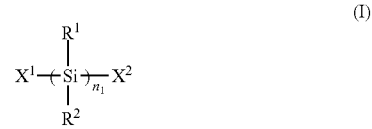

In the formula, $R^1$ and $R^2$ each independently represent a hydrogen atom, a hydrocarbon group, an alkoxy group, or a halogen atom, $X^1$ and $X^2$ each independently represent a halogen atom or an alkoxy group, and $n_1$ is an integer that is greater than or equal to 1.

Advantageous Effects of Invention

According to an embodiment of the present invention, a method for producing a cyclic polysilane compound simply and easily in a higher yield can be provided.

DESCRIPTION OF EMBODIMENTS

1. Method for Producing Cyclic Polysilane Compound

The method for producing a cyclic polysilane compound according to an embodiment of the present invention comprising a reaction step of adding a silane monomer compound into a liquid mixture containing metallic sodium and a lithium salt and allowing them to react.

Furthermore, the method for producing a cyclic polysilane compound according to the present embodiment may include a preparation step of preparing a liquid mixture containing the metallic sodium and the lithium salt prior to the reaction step described above. Hereinafter, the reaction step and the preparation step will be described in order.

Reaction Step

In the reaction step, a silane monomer compound represented by Formula (I) below is added into a liquid mixture containing metallic sodium and a lithium salt. By adding the silane monomer compound to the liquid mixture, a cyclic polysilane compound can be formed from the silane monomer compound. Note that the liquid mixture will be described below.

[Chem. 2]

In Formula (I), $R^1$ and $R^2$ each independently represent a hydrogen atom, a hydrocarbon group, an alkoxy group, or a halogen atom, $X^1$ and $X^2$ each independently represent a halogen atom or an alkoxy group, and $n_1$ is an integer that is greater than or equal to 1.

Examples of the alkoxy group in $R^1$ and $R^2$ as well as $X^1$ and $X^2$ include a methoxy group and an ethoxy group. Examples of the halogen atom include a fluorine atom, a chlorine atom, a bromine atom, and an iodine atom. These alkoxy group and halogen atom have a large electronegativity difference from silicon, leading to intramolecular polarization in the silane monomer compound, and thus have excellent reactivity and are substituents that function as leaving groups in reactions. As such a substituent, from the perspectives of stability and stable supply of the silane monomer compound itself, a halogen atom is preferred, and a chlorine atom is more preferred.

The number of the alkoxy groups or the halogen atoms in the silane monomer compound is two or more (such as two, three, or four); however, from the perspective of forming a cyclic polysilane compound without branch, the number of the alkoxy groups or the halogen atoms in the silane monomer compound is preferably two ($X^1$ and $X^2$). Such two or more alkoxy groups or halogen atoms in one silane monomer compound may be the same or different.

Examples of the hydrocarbon group in $R^1$ and $R^2$ include alkyl groups, alkenyl groups, alkynyl groups, and aryl groups.

$R^1$ and $R^2$ can be a side chain in a cyclic polysilane compound. Therefore, le and $R^2$ in the silane monomer compound can be selected depending on the cyclic polysilane compound which is the synthesis target. In one embodiment, $R^1$ and $R^2$ are each preferably a hydrogen atom or a hydrocarbon group, more preferably a hydrocarbon group, even more preferably an alkyl group, and particularly preferably a methyl group.

$X^1$ and $X^2$ are each independently a halogen atom or an alkoxy group, and $X^1$ and $X^2$ are preferably identical functional groups from the perspective of achieving a higher yield of the cyclic polysilane compound.

$n_1$ is an integer that is greater than or equal to 1, and preferably not greater than the number of silicon in the cyclic polysilane compound which is the synthesis target. $n_1$ can be, for example, 1, 2, 3, 4, 5, 6, 7, 8, 9, 10 or greater. From the perspectives of stability of the silane monomer compound itself and enhancing reactivity of silane monomer compounds, $n_1$ is preferably 1 or 2, and more preferably 1.

In one embodiment, for the silane monomer compound, in Formula (I), $R^1$ and $R^2$ preferably each independently represent a hydrogen atom or a hydrocarbon group, $X^1$ and $X^2$ preferably each independently represent a halogen atom, and $n_1$ is preferably an integer that is greater than or equal to 1. In a further preferred example, $X^1$ and $X^2$ are identical atoms.

In general, when cyclic polysilane is produced by adding a silane monomer compound to a solution containing a metal, a cyclic polysilane compound, a chain polysilane compound, and a polysilane compound having both cyclic and chain structures are formed. However, when the preferred silane monomer compound described above is used, excessive side reactions are inhibited, and the reaction that produces the cyclic polysilane compound has a higher proportion. Therefore, use of the silane monomer compound described above is preferred from the perspective of increase the yield of the cyclic polysilane.

The reaction step in the present embodiment includes an addition step of adding a silane monomer compound. After the addition step, by continuing the reaction, a cyclic polysilane can be obtained. Furthermore, in the case where the temperature of the liquid mixture described below in the addition step is lower than 20° C., a temperature increase step in which the reaction is performed in an increased temperature is preferably further included after the addition step. Each of the steps will be explained.

Addition Step

The silane monomer compound added in the addition step is a compound represented by Formula (I) above. The silane monomer compound may be added alone or may be mixed with a solvent. In one embodiment, since the silane monomer compound is liquid at room temperature, the silane monomer compound can be mixed with a solvent. Note that the solvent is preferably identical with the solvent for the liquid mixture described below.

Examples of the solvent include aprotic polar solvents. Examples of the aprotic polar solvent include tetrahydrofuran (THF), 1,2-dimethoxyethane, 4-methyltetrahydropyran, bis(2-methoxyethyl)ether, 1,4-dioxane, and cyclopentyl methyl ether. These solvents may be used alone, or a mixture of two or more types of these may be used. Among these, tetrahydrofuran, 4-methyltetrahydropyran, and cyclopentyl methyl ether are preferred, and tetrahydrofuran is more preferred.

In the case where the silane monomer compound to be added is mixed with the solvent, increase in local concentration of the silane monomer compound during the addition can be reduced. Therefore, the proportion of the reaction that produces a cyclic polysilane compound is increased compared to the reaction that produces a chain polysilane compound, and thus the yield of the cyclic polysilane compound is increased.

In the case where the silane monomer compound is mixed with the solvent, the amount of the solvent is not particularly limited; however, from the perspective of inhibition of formation of chain polycarbosilane, the amount is preferably from 1 mL to 50 mL, and more preferably from 5 mL to 20 mL, per 1 g of the silane monomer compound.

The temperature when mixing the silane monomer compound and the solvent is not particularly limited; however, the mixing and stirring are preferably performed at 0° C. to room temperature.

The amount of the silane monomer compound added in the addition step is preferably defined by a ratio relative to the amount of the metallic sodium contained in the liquid mixture. The ratio of the amount of the metallic sodium relative to the amount of the silane monomer compound is not particularly limited; however, from the perspective of the yield of the cyclic polysilane compound, the silane monomer compound is preferably added in a manner that the metallic sodium amount is 1.0 molar equivalent or greater per one leaving group of the silane monomer compound. That is, for example, in the case where the total number of the leaving groups in one silane monomer compound is N, the amount of the metallic sodium is preferably N×1.0 molar equivalent or greater relative to the amount of the silane monomer compound. Furthermore, from the perspective of post-treatment after the reaction, the silane monomer compound is preferably added in a manner that the amount of the metallic sodium contained in the liquid mixture is 3.0 molar equivalent or less per one leaving group. Furthermore, from the perspective of side reaction inhibition, the silane monomer compound is added in a manner that the metallic sodium amount per one leaving group is preferably 2.0 molar equivalent or less, more preferably 1.5 molar equivalent or less, and even more preferably 1.3 molar equivalent or less.

The addition method of the silane monomer compound is not particularly limited but batchwise addition is preferred, and dropwise addition is more preferred. Thereby, increase in local concentration of the silane monomer compound can be reduced, and thus formation of chain polysilane compound can be inhibited. Therefore, the proportion of the reaction that produces the cyclic polysilane compound is increased, and thus the yield of the cyclic polysilane compound is increased.

The addition of the silane monomer compound is preferably performed under stirring from the perspective of reducing increase in local concentration of the silane monomer compound in the liquid mixture. Furthermore, the stirring is preferably continued even after the addition of the silane monomer compound is completed. The stirring can be performed by, for example, a stirring blade, a magnetic stirrer, or a shaker but is not limited thereto.

The temperature of the liquid mixture in the addition step is preferably −10° C. or higher, and more preferably −5° C. or higher.

Furthermore, the temperature of the liquid mixture is preferably lower than the boiling point of the liquid mixture after the silane monomer compound is added, more preferably lower than 50° C., more preferably lower than 45° C., more preferably lower than 40° C., more preferably lower than 35° C., and more preferably lower than 30° C. Furthermore, from the perspective of suppressing exothermic heat, the temperature is preferably not higher than room temperature, preferably lower than 25° C., even more preferably lower than 20° C., even more preferably lower than 15° C., even more preferably lower than 10° C., and even more preferably lower than 5° C. In one embodiment, the mixture is cooled in ice, and the temperature is 0° C. Note that "not higher than room temperature" is intended to mean 27° C. or lower, 26° C. or lower, or 25° C. or lower.

In the addition step, by setting the temperature of the liquid mixture within the range described above, production of chain polysilane is inhibited, and a high yield of the cyclic polysilane can be achieved.

Note that, hereinafter, "liquid mixture after the silane monomer compound is added" is simply described as "reaction solution" unless otherwise noted.

The amount of the silane monomer compound added per unit time is not particularly limited, can be appropriately set depending on the entire volume or the like and, for example, is preferably from 0.1% to 30%, and more preferably from 0.2% to 25%, relative to the total added amount per minute.

The time of the addition step is not particularly limited and can be appropriately set depending on the entire volume or the like. For example, the time is preferably 1 minute or longer, and more preferably 3 minutes or longer, from the perspective of suppressing exothermic heat. Furthermore, from the perspective of shortening the reaction time, the time of the addition step is preferably 18 hours or less, more preferably 8 hours or less, and even more preferably 5 hours or less.

In the case where the stirring is continued after completion of the addition of the silane monomer compound, the stirring time after the addition is not particularly limited and, for example, is preferably from 1 hour to 10 hours, more preferably from 2 hours to 8 hours, and even more preferably from 3 hours to 5 hours. In one embodiment, the stirring time after the addition is 3 hours.

Temperature Increase Step

In the method for producing a cyclic polysilane compound according to the present embodiment, in the case where the temperature of the liquid mixture in the addition step is lower than 20° C., a temperature increase step in which the reaction is continued at an increased temperature of the reaction solution is preferably included. That is, after the silane monomer compound is added during a period of time when the liquid mixture is at a first temperature, reaction in the reaction solution is preferably continued at a second temperature, which is higher than the first temperature.

Consequently, exothermic heat and excessive reaction during initial stage of the reaction including the addition step can be inhibited, and the reaction progress after the addition can be accelerated. Note that the first temperature is a temperature of the liquid mixture when the silane monomer compound is added to the liquid mixture described above and is preferably lower than 20° C., more preferably lower than 15° C., even more preferably lower than 10° C., and particularly preferably lower than 5° C. In one embodiment, the mixture is cooled in ice, and the temperature is 0° C.

The second temperature is preferably 0° C. or higher, more preferably 5° C. or higher, even more preferably 10° C. or higher, and most preferably 20° C. or higher. Furthermore, the second temperature is preferably lower than the boiling point of the reaction solution. In one embodiment, the temperature of the reaction solution is at room temperature (23° C. to 27° C.).

The method of increasing the temperature from the first temperature to the second temperature is not particularly limited, and examples thereof include a method in which the reaction solution after the addition step is placed in a predetermined temperature atmosphere and a method in which heating is performed to a predetermined temperature by using, for example, a heater, a water bath, or electromagnetic waves.

The time for the temperature increase in the temperature increase step is not particularly limited and can be appropriately set depending on the entire volume or the like. For example, the time is preferably from 0.1 hours to 5 hours, and more preferably from 0.25 hours to 3 hours.

The method for producing the cyclic polysilane in the present embodiment includes a reaction step, and the reaction step includes an addition step, and a temperature increase step as necessary. The total time for the reaction step is not particularly limited and, for example, is preferably from 1 hour to 35 hours, and more preferably from 3 hours to 30 hours.

Furthermore, the temperature of the reaction solution after the addition step is preferably 20° C. or higher from the perspective of reaction progress. Furthermore, the temperature of the reaction solution after the addition step is preferably lower than the boiling point of the reaction solution, and preferably lower than 50° C. from the perspective of inhibition decomposition of products.

The method for producing the cyclic polysilane in the present embodiment does not require a plurality of reactions, and thus it is simple and easy, and can shorten the time.

Furthermore, because a water-insoluble substance, such as naphthalene, is not used as an additive, purification of the obtained cyclic polysilane is easy.

Preparation Step

The method for producing the cyclic polysilane in the present embodiment may include preparing the liquid mixture prior to the reaction step described above.

Liquid Mixture

The liquid mixture of the present embodiment contains metallic sodium and a lithium salt.

The form of the metallic sodium is not particularly limited; however, from the perspectives of increasing the surface area and further increasing the yield of the cyclic polysilane compound, a sodium dispersion is preferred.

The sodium dispersion (SD) in the present specification is a dispersion, in which metallic sodium having an average particle diameter from 1 μm to 30 μm is dispersed in an electrical insulating oil. From the perspectives of reactivity and safety, the average particle diameter is preferably from 2 μm to 10 μm, and more preferably from 3 μm to 5 μm. Examples of the electrical insulating oil include aliphatic hydrocarbons such as liquid paraffin. The amount of the metallic sodium in the sodium dispersion is not particularly limited but is preferably from 20 wt % to 30 wt % from the perspective of safety.

The lithium salt may be an inorganic salt or an organic salt. Preferred examples of the inorganic salt include halides and salts of inorganic acids, and preferred examples of the organic salt include carboxylate, sulfonate, and salts of phenols. Examples of the halide include lithium chloride, lithium bromide, lithium iodide, and lithium fluoride. Examples of the salt of inorganic acids include lithium carbonate, lithium hydrogen carbonate, lithium nitrate, lithium nitrite, lithium sulfate, and lithium sulfite. Examples of the carboxylate include lithium acetate, lithium formate, and lithium citrate. Examples of the sulfonate include lithium methanesulfonate, lithium benzenesulfonate, and lithium p-toluenesulfonate. Examples of the salt of phenols include lithium phenoxide, lithium salicylate, and cresol lithium salts. Among these, an inorganic salt is preferred, a halide is more preferred, and lithium chloride is even more preferred. One of these lithium salts may be used alone, or a plurality of these lithium salts may be mixed for use.

The amount of substance (mol) of lithium contained in the liquid mixture of the present embodiment is preferably 0.01 times or greater, more preferably 0.02 times or greater, and even more preferably 0.03 times or greater the amount of substance (mol) of the metallic sodium. By setting the content of the lithium salt within this range, the amount of by-product chain polysilane compound can be inhibited.

The amount of substance of lithium contained in the liquid mixture of the present embodiment is preferably 5 times or less, more preferably 1 time or less, and even more preferably 0.2 times or less, and particularly preferably 0.1 times or less the amount of substance of the metallic sodium. By setting the content of the lithium salt within this range, decomposition of the produced cyclic polysilane compound can be inhibited.

Thus, by setting the amount of substance of the lithium contained in the liquid mixture in the present embodiment to the range described above, the proportion of the reaction that produces the cyclic polysilane compound is increased while excessive side reactions are inhibited, and thus the yield of the cyclic polysilane compound is increased. In one embodiment, the amount of substance of the lithium contained in the liquid mixture is 0.05 times the amount of substance of the metallic sodium.

The liquid mixture of the present embodiment preferably further contains a solvent. The solvent is required to be a liquid that can disperse metallic sodium and that can disperse or dissolve a lithium salt. Preferred examples correspond to the solvents exemplified for "Addition step" in the section of "Reaction step". Note that, from the perspective of simplification of operation and solvent recovery, the solvent of the liquid mixture is preferably the same solvent as that used during the addition of the silane monomer compound.

In the case where the sodium dispersion described above is used as the metallic sodium, since the metallic sodium is not required to be melted in the solvent, a solvent having a boiling point of lower than 100° C., lower than 90° C., lower than 85° C., lower than 80° C., lower than 75° C., or lower than 70° C. can be selected.

The amount of the solvent in the liquid mixture is not particularly limited; however, from the perspective of inhibition formation of chain polysilane compounds, the amount is preferably from 5 mL to 50 mL, and more preferably from 10 mL to 40 mL, per 1 g of the metallic sodium.

Preparation of Liquid Mixture

The liquid mixture is preferably prepared as described below.

First, metallic sodium is added to a solvent. The temperature of the solution at this time is not particularly limited, but it is preferably 0° C. or higher and not higher than room temperature. In one embodiment, the temperature at which the metallic sodium is added to the solvent is room temperature (approximately 23° C. to 27° C.).

Furthermore, the metallic sodium is preferably dispersed in a solvent. Thus, when the metallic sodium is added to the solvent, stirring is preferably performed before sedimentation occurs, and addition is more preferably performed while the solution is stirred.

Next, a lithium salt is added to form a liquid mixture. The temperature of the solution at this time is not particularly limited, but it is preferably −10° C. or higher, and more preferably −5° C. or higher. The temperature of the liquid mixture is preferably not higher than room temperature. In one embodiment, the liquid mixture is cooled in ice, and the temperature is 0° C.

2. Cyclic Polysilane Compound

The cyclic polysilane compound obtained by the method for producing a cyclic polysilane compound according to the present embodiment is a compound formed by polymerization of the raw material silane monomer compound in a cyclic or polycyclic form, and may have a side chain of silane or organic silane. The cyclic polysilane compound formed in the present embodiment is, for example, represented by Formula (II) below.

[Chem. 3]

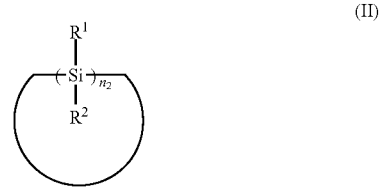

(II)

$R^1$ and $R^2$ are the same as those of $R^1$ and $R^2$ in the raw material silane monomer compound. $n_2$ is an integer that is greater than or equal to 3. For example, $n_2$ can be 3, 4, 5, 6, 7, 8, 9, 10 or greater. In one embodiment, $n_2$ is preferably 6.

Note that, in the case where $R^1$ or $R^2$ of the raw material silane monomer compound is a halogen atom or an alkoxy group, a cyclic or polycyclic polysilane compound having a side chain may be obtained.

3. Summary

As is apparent from the above, the present inventions include the following.

A method for producing a cyclic polysilane compound including a reaction step of adding a silane monomer compound represented by Formula (I) below into a liquid mixture containing metallic sodium and a lithium salt and allowing them to react.

[Chem. 4]

(I)

In the formula, $R^1$ and $R^2$ each independently represent a hydrogen atom, a hydrocarbon group, an alkoxy group, or a halogen atom, $X^1$ and $X^2$ each independently represent a halogen atom or an alkoxy group, and $n_1$ is an integer that is greater than or equal to 1.

The method for producing a cyclic polysilane compound, in which the silane monomer compound is added batchwise.

The method for producing a cyclic polysilane compound, in which a temperature condition in the reaction step is −10° C. or higher and lower than a boiling point of a reaction solution.

The method for producing a cyclic polysilane compound, in which the temperature condition for addition of the silane monomer compound is −10° C. or higher and not higher than room temperature.

The method for producing a cyclic polysilane compound, in which a temperature of the reaction solution after addition of the silane monomer compound is 20° C. or higher.

The method for producing a cyclic polysilane compound, in which the lithium salt is an inorganic salt.

The method for producing a cyclic polysilane compound, in which an amount of substance of lithium contained in the liquid mixture is 0.01 times to 5 times an amount of substance of the metallic sodium.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

Example 1

In a 200 mL four-necked flask purged with argon, 30 mL of tetrahydrofuran (THF) and 5.87 g of sodium dispersion (25 wt % sodium dispersion) were charged and stirred, and thus a liquid mixture was prepared. In 25 mL of THF, 3.21 g of dichlorodimethylsilane was dissolved, and thus a silane monomer compound solution was prepared.

After the liquid mixture was ice-cooled to 0° C., and 0.32 g of lithium fluoride was charged as an additive. The silane monomer compound solution was added dropwise for approximately 5 hours while stirring was performed in ice. After the dropwise addition, stirring was further performed for 3 hours, and then reaction was performed overnight at room temperature.

Analysis of the reaction solution was performed by using gas chromatography, and formation of dodecamethylcyclohexasilane, which is a cyclic polysilane compound, was confirmed, and the yield was determined. The results are shown in the tables.

Example 2

Operation was performed in the same manner as in Example 1 except for changing lithium fluoride to 0.53 g of lithium chloride.

Example 3

Operation was performed in the same manner as in Example 1 except for changing lithium fluoride to 1.08 g of lithium bromide.

Example 4

Operation was performed in the same manner as in Example 1 except for changing lithium fluoride to 1.68 g of lithium iodide.

Example 5

Operation was performed in the same manner as in Example 1 except for changing lithium fluoride to 0.92 g of lithium carbonate.

Example 6

In a 500 mL four-necked flask purged with argon, 180 mL of THF and 29.90 g of sodium dispersion (25 wt % sodium dispersion) were charged and stirred, and thus a liquid mixture was prepared. In 150 mL of THF, 19.33 g of dichlorodimethylsilane was dissolved, and thus a silane monomer compound solution was prepared.

After the liquid mixture was ice-cooled to 0° C., and 0.71 g of lithium chloride was charged as an additive. The silane monomer compound solution was added dropwise for approximately 5 hours while stirring was performed in ice. After the dropwise addition, stirring was further performed for 3 hours, and then reaction was performed overnight at room temperature. For the obtained reaction solution, the same analysis of the reaction solution as Example 1 was performed.

Example 7

In a 200 mL four-necked flask purged with argon, 30 mL of THF and 4.99 g of sodium dispersion (25 wt % sodium dispersion) were charged and stirred, and thus a liquid mixture was prepared. In 25 mL of THF, 3.23 g of dichlorodimethylsilane was dissolved, and thus a silane monomer compound solution was prepared.

In the liquid mixture maintained at 23° C., 0.12 g of lithium chloride was charged as an additive. Then, the silane monomer compound solution was added dropwise for approximately 5 minutes while stirring was performed. After the dropwise addition, while the temperature was maintained, reaction was further performed under stirring for 5 hours. For the obtained reaction solution, the same analysis of the reaction solution as Example 1 was performed.

Example 8

A cyclic polysilane compound was produced by changing the ratio of the amount of substance of the additive to the amount of substance of the monomer. Specifically, the same operation as in Example 2 was performed for each of the cases where the amount of lithium chloride was 0.11 g, 1.07 g, or 2.77 g. The results are shown in Table 2.

Comparative Example 1

The same operation as in Example 1 was performed except for not adding lithium fluoride.

Comparative Example 2

Operation was performed in the same manner as in Example 1 except for changing lithium fluoride to 1.57 g of iron(II) chloride. However, in the gas chromatography analysis conditions, a peak of dodecamethylcyclohexasilane was not confirmed, and the yield was not determined.

Comparative Example 3

The same operation as in Example 7 was performed except for not using lithium chloride.

Comparative Example 4

Operation was performed in the same manner as in Example 7 except for changing lithium chloride to 0.21 g of potassium chloride.

Comparative Example 5

Operation was performed in the same manner as in Example 7 except for changing lithium chloride to 0.46 g of cesium chloride.

Comparative Example 6

Operation was performed in the same manner as in Example 7 except for changing lithium chloride to 0.26 g of magnesium chloride.

Comparative Example 7

Operation was performed in the same manner as in Example 7 except for changing lithium chloride to 0.31 g of calcium chloride.

Comparative Example 8

Operation was performed in the same manner as in Example 7 except for changing lithium chloride to 0.37 g of zinc chloride. However, in the gas chromatography analysis conditions, a peak of dodecamethylcyclohexasilane was not confirmed, and the yield was not determined.

Comparative Example 9

Operation was performed in the same manner as in Example 7 except for changing lithium chloride to 0.37 g of aluminum chloride. However, in the gas chromatography analysis conditions, a peak of dodecamethylcyclohexasilane was not confirmed, and the yield was not determined.

TABLE 1

| | Additive | Additive equivalent (eq) per monomer | Metal (mol) in additive/ metallic sodium (mol) | Yield (%) |
|---|---|---|---|---|
| Example 1 | Lithium fluoride | 0.5 | 0.19 | 28.0 |
| Example 2 | Lithium chloride | 0.5 | 0.19 | 72.4 |
| Example 3 | Lithium bromide | 0.5 | 0.19 | 55.6 |
| Example 4 | Lithium iodide | 0.5 | 0.20 | 34.6 |
| Example 5 | Lithium carbonate | 0.5 | 0.39 | 27.9 |
| Example 6 | Lithium chloride | 0.11 | 0.05 | 81.4 |
| Example 7 | Lithium chloride | 0.11 | 0.05 | 77.1 |
| Comparative Example 1 | — | — | — | 24.5 |
| Comparative Example 2 | Iron (II) chloride | 0.5 | 0.19 | — |
| Comparative Example 3 | — | — | — | 26.0 |
| Comparative Example 4 | Potassium chloride | 0.11 | 0.05 | 18.0 |
| Comparative Example 5 | Cesium chloride | 0.11 | 0.05 | 3.5 |
| Comparative Example 6 | Magnesium chloride | 0.11 | 0.05 | 3.0 |
| Comparative Example 7 | Calcium chloride | 0.11 | 0.05 | 12.7 |
| Comparative Example 8 | Zinc chloride | 0.11 | 0.05 | — |
| Comparative Example 9 | Aluminum chloride | 0.11 | 0.05 | — |

TABLE 2

| Additive (g) (Lithium chloride) | Additive equivalent (eq) per monomer | Lithium (mol)/ metallic sodium (mol) | Yield (%) |
|---|---|---|---|
| 0.11 | 0.1 | 0.041 | 75.7 |
| 1.07 | 1.0 | 0.40 | 46.1 |
| 2.77 | 2.6 | 1.0 | 48.2 |

The invention claimed is:

1. A method for producing a cyclic polysilane compound comprising a reaction step of adding a silane monomer compound represented by Formula (I) into a liquid mixture containing metallic sodium and a lithium chloride and allowing them to react:

[Chem. 1]

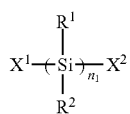

(I)

where, R1 and R2 each independently represent a hydrogen atom, a hydrocarbon group, an alkoxy group, or a halogen atom, X1 and X2 each independently represent a halogen atom or an alkoxy group, and n1 is an integer that is greater than or equal to 1.

2. The method for producing a cyclic polysilane compound according to claim 1, wherein the silane monomer compound is added batchwise.

3. The method for producing a cyclic polysilane compound according to claim 1, wherein a temperature condition in the reaction step is −10° C. or higher and lower than a boiling point of a reaction solution.

4. The method for producing a cyclic polysilane compound according to claim 3, wherein the temperature condition for addition of the silane monomer compound is −10° C. or higher and not higher than room temperature.

5. The method for producing a cyclic polysilane compound according to claim 3, wherein a temperature of the reaction solution after addition of the silane monomer compound is 20° C. or higher.

6. The method for producing a cyclic polysilane compound according to claim 1, wherein an amount of substance of lithium contained in the liquid mixture is from 0.01 times to 5 times an amount of substance of the metallic sodium.

* * * * *